United States Patent [19]

Corry

[11] 4,024,453

[45] May 17, 1977

[54] INVERTER FOR SUPPLYING A REGULATED VOLTAGE

[75] Inventor: Thomas M. Corry, Goleta, Calif.

[73] Assignee: General Motors Corporation, Detroit, Mich.

[22] Filed: Aug. 26, 1976

[21] Appl. No.: 718,023

[52] U.S. Cl. .................................. 321/2; 321/11; 321/45 C

[51] Int. Cl.² ........................................ H02M 3/315

[58] Field of Search ............ 307/252 M; 321/2, 11, 321/14, 45, 45 C; 331/113 S

[56] References Cited

UNITED STATES PATENTS

| | | | |
|---|---|---|---|
| 3,118,105 | 1/1964 | Relation et al. | 321/45 R |
| 3,124,740 | 3/1964 | Corey et al. | 321/45 R |
| 3,319,149 | 5/1967 | Start | 321/14 |
| 3,391,328 | 7/1968 | Mokrytzki | 321/45 R |

Primary Examiner—William M. Shoop
Attorney, Agent, or Firm—Howard N. Conkey

[57] ABSTRACT

A controlled rectifier resonant bridge inverter having its operating frequency varied to maintain a regulated voltage supplied to a load. The inverter has a commutating circuit having a first resonant frequency defining a maximum inverter operating frequency during normal load conditions and a second higher resonant frequency defining a higher maximum inverter operating frequency during short circuit load conditions to provide reliable inverter operation for all load conditions including a short circuit load condition.

2 Claims, 1 Drawing Figure

U.S. Patent May 17, 1977 4,024,453
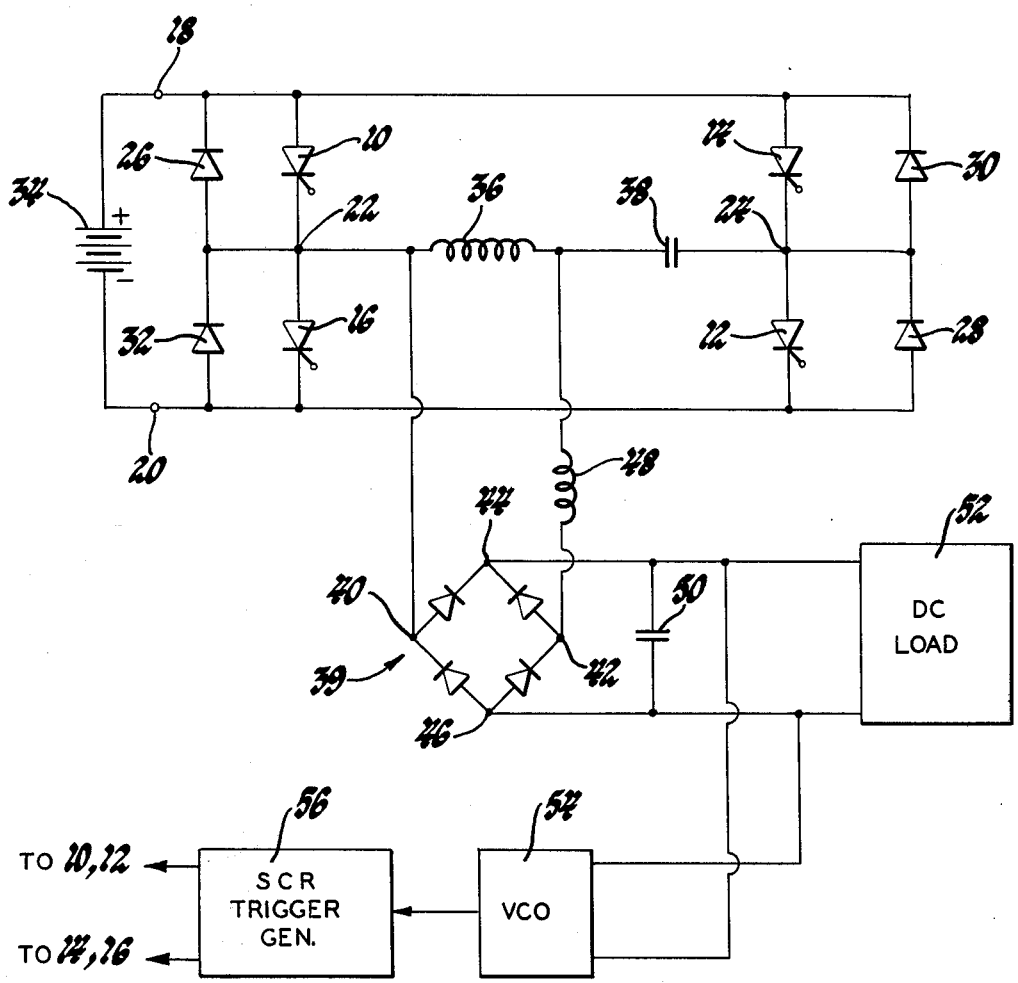

INVERTER FOR SUPPLYING A REGULATED VOLTAGE

The invention herein described was made in the course of work on a contract or subcontract thereunder with the Department of Defense.

This invention is directed toward an inverter voltage regulator capable of reliable operation for all load conditions including a short circuit load condition.

It is generally known to provide for voltage regulation by means of an inverter whose frequency of operation is varied in order to maintain a constant output voltage. However, these known series resonant inverters generally require large frequency excursions over varying load conditions in order to maintain a constant DC output and require complex and sophisticated circuitry to provide for short circuit protection. The general object of this invention is to provide an improved inverter rectifier for supplying a regulated DC output which does not exhibit these deficiencies.

It is another object of this invention to provide an inverter regulator for supplying a regulated DC voltage wherein the inverter operating frequency varies over a small frequency range for all normal load conditions and which is capable of operating under all load conditions including a short circuit load.

It is another object of this invention to provide an inverter regulator having a first maximum operating frequency for normal load conditions and a second higher maximum operating frequency for short circuit load conditions.

These and other objects of this invention are provided by means of a controlled rectifier bridge inverter having a commutating circuit including a commutating inductor and commutating capacitor series coupled across the output of the bridge inverter. A full wave bridge rectifier has its input terminals series coupled with a second inductor across the commutating inductor and has its output terminals coupled across a filter capacitor whose voltage charge comprises the regulated voltage. The voltage across a filter capacitor controls the operating frequency of a voltage controlled oscillator to vary the frequency of operation of the bridge inverter as a function of the sensed voltage. To provide for voltage regulation under varying load conditions with narrow frequency excursions from the voltage controlled oscillator, the bridge inverter is operated at frequencies approaching the resonant frequency of the commutating inductor and commutating capacitor for maximum anticipated load conditions. If the load becomes short circuited, the resonant frequency of the inverter is increased as defined by the commutating capacitor and the parallel combination of the commutating inductor and second inductor. This resonant frequency is made greater than the maximum frequency of operation of the inverter as determined by the voltage controlled oscillator to thereby provide reliable operation into a short circuit load.

The invention may be best understood by reference to the following description of a preferred embodiment and the drawing which is a schematic diagram of the inverter regulator incorporating the principles of this invention.

Referring to the drawing, there is illustrated an inverter comprised of the controlled rectifiers 10, 12, 14 and 16 connected in a bridge configuration having input terminals 18 and 20 and output terminals 22 and 24. Bypass diodes 26, 28, 30 and 32 are each coupled in parallel with a respective one of the controlled rectifiers 10, 12, 14 and 16. Each of the diodes 26 – 32 is oppositely poled relative to the controlled rectifier parallel coupled therewith so that its conduction reverse biases the respective controlled rectifier. For example, the anode of the diode 26 is coupled to the cathode of the controlled rectifier 10 and the cathode of the diode 26 is coupled to the anode of the controlled rectifier 10.

A DC voltage source 34 is coupled across the input terminals 18 and 20 of the bridge inverter. The bridge inverter includes a commutating circuit having a commutating inductor 36 and a commutating capacitor 38 series coupled across the output terminals 22 and 24.

The bridge operates in the normal manner, i.e., the controlled rectifiers 10 and 12 in opposed sides of the bridge are gated conductive alternately with the controlled rectifiers 14 and 16 in opposed sides of the bridge. Commutation of the conducting controlled rectifiers is provided by the commutating circuit between the output terminals 22 and 24. For example, when the controlled rectifiers 10 and 12 are simultaneously gated conductive, the capacitor 38 is charged from the DC voltage source 34 in resonant fashion through the controlled rectifiers 10 and 12. The voltage across the capacitor 38 increases to a voltage greater than the voltage of the DC source 34 and then discharges back to the DC voltage source 34 through the bypass diodes 26 and 28. The current through the bypass diodes 26 and 28 reverse biases the controlled rectifiers 10 and 12 which are held cut-off until they have completely recovered. Thereafter, the controlled rectifiers 14 and 16 are gated conductive to again charge the capacitor 18 in resonant fashion from the DC voltage source in the same manner previously described. When the capacitor 38 begins to discharge through the bypass diodes 30 and 32, the controlled rectifiers 14 and 16 are commutated.

The frequency at which the alternate controlled rectifier pairs 10, 12 and 14, 16 can be safely gated conductive is limited by the resonant frequency of the commutation circuit between the output terminals 22 and 24. For example, if the controlled rectifiers 10 and 12 are conducting and the controlled rectifiers 14 and 16 are gated conductive prior to the capacitor 38 resonantly charging and thereafter discharging through the diodes 26 and 28 for the required controlled rectifier turn-off time to commutate the controlled rectifiers 10 and 12, all of the controlled rectifiers will be conductive to thereby create a short circuit across the DC voltage source 34. Consequently, the inverter cannot be operated at a frequency greater than a frequency determined by the resonant frequency of the commutating circuit between the output terminals 22 and 24. The upper frequency limit must provide sufficient time for the commutating capacitor 38 to resonantly charge and subsequently discharge for a time to provide controlled rectifier commutation.

To provide for a DC output signal from the inverter, a full wave bridge rectifier 39 is provided having input terminals 40 and 42 and output terminals 44 and 46. The input terminal 42 is coupled to one side of the commutating inductor 36 through an inductor 48 and the input terminal 40 is coupled to the opposite side of the commutating inductor 36. The output of the full wave bridge rectifier 39 across the output terminals 44 and 46 is coupled across a filter capacitor 50 whose voltage charge comprises the regulated voltage output of the inverter regulator of this invention. The regulated voltage is supplied to a DC load 52. The inductance of the inductor 48 is smaller than the inductance of the inductor 36. For example, the inductance of the inductor may be ten times the inductance of the inductor 48.

When one of the controlled rectifier pairs 10, 12 or 14, 16 is gated conductive, the charging current through the capacitor 38 initially flows through the lower impedance path including the inductor 48, the full wave bridge rectifier 39 and the filter capacitor 50 until the filter capacitor 50 becomes charged. Thereafter, all of the charging current of the commutating capacitor 38 flows through the inductor 36 until the commutating capacitor 38 is fully charged. The fully charged voltage of the capacitor 38 exceeds the voltage of the DC voltage source 34. Therefore, the capacitor 38 begins to discharge current back to the DC voltage source 34 through the bypass diodes 26 and 28 or 30 and 32 associated with the conducting controlled rectifiers. This current creates a reverse bias across the associated controlled rectifiers to hold them cut off until they have completely recovered. During the time that the capacitor 38 is discharging excess voltage, the polarity across the inductor 36 reverses causing part of the capacitor 38 stored energy to be rectified and delivered to the load. Thereafter, when the other one of the controlled rectifier pairs 10, 12 or 14, 16 are gated conductive, the capacitor 38 is charged in the other direction to again charge the capacitor 50 in the manner previously described.

As can be seen, the frequency of operation of the inverter controls the average value of current available to charge the capacitor 50. Further, if the frequency of the inverter were increased to a value such that the nonconducting controlled rectifiers are gated conductive while the voltage charge across the capacitor 38 is yet greater than the voltage of the DC voltage source 34, a significantly increased amount of average current is available to charge the filter capacitor 50. In this manner, operation of the inverter approaching the resonant frequency of the commutating circuit is effective to provide large values of current for charging the filter capacitor 50 and for supplying the load 52.

To provide for a regulated voltage, the voltage across the filter capacitor 50 is coupled to a voltage controlled oscillator 54 having a frequency of operation determined by the magnitude of the voltage. The output of the voltage controlled oscillator 54 controls a conventional controlled rectifier trigger generator which generates a pair of alternating trigger pulses, each being coupled to the gate electrodes of the controlled rectifiers in a respective one of the controlled rectifier pairs 10, 12 and 14, 16. When the voltage across the filter capacitor 50 varies from a specified value, the frequency of the voltage controlled oscillator 54 varies to alter the frequency of operation of the inverter to vary the current supplied to the filter capacitor 50 in a sense to maintain the desired regulated voltage. For maximum anticipated values of the DC load 52, the frequency of the trigger pulses from the generator 56 as controlled by the voltage controlled oscillator approaches the inverter operational frequency limit determined by resonant frequency of the commutating circuit. In this manner, maximum current can be supplied during maximum load demands to maintain a constant regulated voltage.

If the load 52 should become short circuited, resulting in discharge of the capacitor 50, the frequency of the voltage controlled oscillator would increase in an effort to maintain the desired regulated voltage. However, since the inverter is operated during maximum normal load conditions at a frequency which just yields sufficient turn-off times to the controlled rectifier as determined by the resonant frequency of the inductor 36 and the capacitor 38, a further increase in the frequency of operation of the inverter (assuming no increase in the resonant frequency of the commutating circuit) would result in insufficient controlled rectifier turn-off time and simultaneous conduction of two series coupled controlled rectifiers.

Reliable short circuit operation of the regulator of this invention is provided by means of the inductor 48 which, upon the occurrence of a short circuit load, is coupled directly in parallel with the commutating inductor 36 through the full wave bridge rectifier 39 and the short circuit. The resonant frequency of the commutating circuit between the terminals 22 and 24 of the bridge inverter is thereby increased as determined by the commutating capacitor 38 and the parallel combination of the commutating inductor 36 and the inductor 48 to thereby increase the maximum safe operating frequency of the inverter at which sufficient controlled rectifier turn-off time is provided. The value of the inductor 48 and the maximum frequency of the voltage controlled oscillator are selected such that the resonant frequency of the commutating circuit between the terminals 22 and 24 during the short circuit condition is greater than the maximum frequency of the trigger pulses from the generator 56 as determined by the maximum frequency of the voltage controlled oscillator 54. In this manner, the frequency of the trigger signals generated by the trigger generator 56 is always less than the maximum operating frequency of the inverter for all load conditions including a short circuit load to thereby provide reliable operation of the inverter regulator for all load conditions.

The preferred embodiment of the invention for the purpose of illustrating the principles thereof is not to be considered as limiting or restricting the invention, since many modifications may be made by the exercise of skill in the art without departing from the scope of the invention.

I claim:

1. An inverter circuit for supplying a regulated DC voltage and characterized by its reliable operation for all load conditions including a short circuit load condition, comprising: a controlled rectifier bridge inverter having a pair of input terminals and a pair of output terminals; a DC voltage source coupled across the input terminals of the inverter; a commutating circuit, the commutating circuit including a commutating capacitor and a commutating inductor series coupled across the output terminals of the inverter, the maximum operating frequency of the controlled rectifier bridge inverter at which required controlled rectifier commutation time is provided being limited by the resonant frequency of the commutating circuit; an output circuit, the output circuit including a full wave bridge rectifier having a pair of input terminals and a pair of output terminals, a second inductor, means series coupling the commutating inductor and the second inductor across the input terminals of the bridge rectifier, and a filter capacitor coupled across the output terminal pair of the bridge rectifier, the filter capacitor being charged through a circuit including the commutating capacitor, the second inductor and the bridge rectifier, the voltage across the filter capacitor comprising the output regulated voltage; load means coupled across the filter capacitor; and means responsive to the voltage across the filter capacitor effective to vary the frequency of operation of the controlled rectifier bridge inverter in a sense to maintain a constant voltage value across the filter capacitor, the last-mentioned means having a predetermined maximum frequency of operation occurring when the load means is short circuited and the filter capacitor is discharged, the commutating capacitor and the commutating inductor defining a commutating circuit resonant frequency that is less than the predetermined maximum frequency when the voltage across the filter capacitor is at the constant voltage value and the commutating capacitor and the parallel combination of the commutating inductor and the second inductor defining a commutating circuit resonant frequency that is greater than the predetermined maximum frequency when the load means is short circuited and the filter capacitor is discharged, the resonant frequency of the commutating circuit being increased to above the predetermined maximum frequency during the period that the load means is short circuited to thereby provide reliable operation of the controlled rectifier bridge inverter for all load conditions including a short circuited load condition.

2. An inverter circuit for supplying a regulated DC voltage and characterized by its reliable operation for all load conditions including a short circuit load condition, comprising: a bridge inverter, the bridge inverter including first, second, third and fourth controlled rectifiers coupled in a bridge configuration, a pair of input terminals, a pair of output terminals and first, second, third and fourth diodes, each diode being coupled in parallel with a respective one of the controlled rectifiers and poled to conduct current in a direction opposite the direction of current through the controlled rectifier parallel coupled therewith; a DC voltage source coupled across the input terminals of the inverter; a commutating circuit, the commutating circuit including a commutating capacitor and a commutating inductor series coupled across the output terminals of the inverter, the commutating capacitor being charged by the DC voltage source when the controlled rectifiers in opposed sides of the bridge inverter are gated conductive to a value greater than the DC voltage source and thereafter discharging through the diodes parallel coupled with the conductive controlled rectifiers to provide for controlled rectifier commutation, the maximum operating frequency of the controlled rectifier bridge inverter at which required controlled rectifier commutation time is provided being limited by the resonant frequency of the commutating circuit; an output circuit, the output circuit including a full wave bridge rectifier having a pair of input terminals and a pair of output terminals, a second inductor, means series coupling the commutating inductor and the second inductor across the input terminals of the bridge rectifier, and a filter capacitor coupled across the output terminal pair of the bridge rectifier, the filter capacitor being charged through a circuit including the commutating capacitor, the second inductor and the bridge rectifier, the voltage across the filter capacitor comprising the output regulated voltage; load means coupled across the filter capacitor; and means responsive to the voltage across the filter capacitor effective to alternately gate conductive the controlled rectifiers in one pair of opposed sides of the bridge inverter and the controlled rectifiers in the other pair of opposed sides of the bridge inverter at a frequency tending to maintain a constant voltage value across the filter capacitor, the last-mentioned means having a predetermined maximum frequency of operation occurring when the load means is short circuited and the filter capacitor is discharged, the commutating capacitor and the commutating inductor defining a commutating circuit resonant frequency that is less than the predetermined maximum frequency when the voltage across the filter capacitor is at the constant voltage value and the commutating capacitor and the parallel combination of the commutating inductor and the second inductor defining a commutating circuit resonant frequency that is greater than the predetermined maximum frequency when the load means is short circuited and the filter capacitor is discharged, the resonant frequency of the commutating circuit being increased to above the predetermined maximum frequency during the period that the load means is short circuited to thereby provide reliable operation of the controlled rectifier bridge inverter for all load conditions including a short circuited load condition.

* * * * *